3,078,188
FILTRATION PROCESS
Giuseppe Assalini, Genoa, Italy, assignor to Rohm & Haas Company, Philadelphia, Pa., a corporation of Delaware
Filed June 2, 1959, Ser. No. 817,623
3 Claims. (Cl. 127—55)

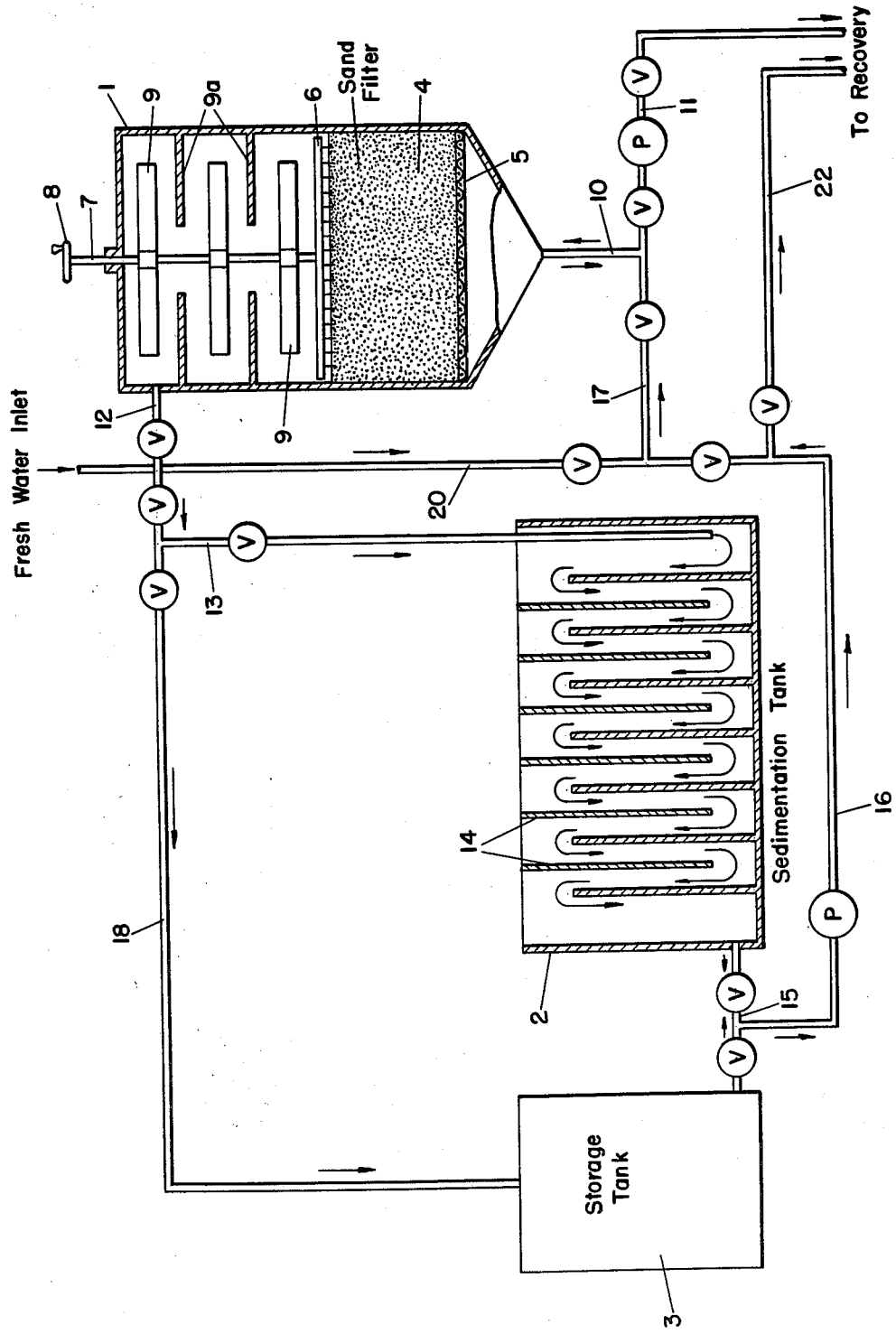

This invention relates to apparatus and a continuous process for filtering precipitates from liquids containing same. In particular, it has reference to devices for facilitating the filtration of matter that passes only with considerable difficulty, if at all, through ordinary filter paper, filter presses, and the like, even with the help of suction, chemical filter aids, etc. The invention also provides on a cyclical basis, in novel coaction with the filtering apparatus, a means for backwashing the filter bed and removing any sediment left after filtration.

An especial need for simple, relatively inexpensive, but rapid and efficient filtration means exists in many commercial enterprises, e.g., in the sugar refining industry. As an illustration, there is at least one process for purifying sugar juices which involves treatment thereof with chemical agents that cause flocculent precipitates to form. These precipitates, which contain objectionable color bodies and other impurities, must be removed from the sugar-containing liquid rapidly and completely in order to make the process commercially feasible. Such a process is described more fully in my copending application, Serial No. 817,467, filed on the same date as the present application.

Typically, when molasses are treated in accordance with the method disclosed in Serial No. 817,467, the precipitate which forms tends to clog the filtering medium of ordinary filtering equipment. The filter medium invariably becomes blocked quite quickly and the rate of filtration thereby is slowed considerably. This difficulty has been completely eliminated by my novel filter in which sand is used as the filter medium, and the surface of the sand is gently raked to break up any cake forming there.

The construction of the novel filter apparatus will be understood from the accompanying drawing where a schematic representation is given of the device as it would appear in a vertical, longitudinal section. In essence, the apparatus consists of a filtration chamber 1, a sedimentation tank 2, and a storage tank 3. Chamber 1, which may conveniently take the form of the cylindrical tank with the conical lower extremity shown in the drawing, is filled to a height of approximately half its depth with a bed 4 of ordinary river sand. A suitable means, such as a mesh screen 5 or loose fiber plug, may be used at the bottom of the sand bed to prevent loss of sand therefrom through the exit end of the chamber.

At the upper surface of the sand bed, and contiguous therewith is a rake 6 which extends across and substantially fills the width of the chamber. The rake may be any convenient design which can be manipulated so as to agitate any filter cake which forms on the sand bed's surface, thereby breaking up and preventing formation of large particles or cakes sufficiently to permit passage of the fluid in the material being filtered. For example, the rake could be in the form of a single, radial arm or any multiple thereof, preferably extending from a center pivot point.

The shape of the raking member could take most any desired form. One of numerous suitable designs could embody the illustrated axially rotatable member which can be turned by means of a rod 7 through the agency of a wheel 8. Turning the rotatable rake member in this manner can provide the agitation necessary to promote the described filter cake breakage.

Above rake 6 there may optionally be provided a series of spaced paddles 9 extending laterally from and being rotatable with rod 7. These paddles help to provide a mild mixing action during the filtration step and also serve to stir the upper portion of the expanded filter bed during a backwashing step which will be described below. As a further option, there may be provided baffles 9a which are rigidly positioned so as to extend radially from the inner wall of chamber 1 part way toward the center. The baffles, which may be alternately spaced with the paddles in between, help to retard the downward movement of a precipitate and give the liquid an opportunity to get to and past the rake before the flocculent material reaches the sand bed.

The bulk of the solid matter is caught at or near the surface of the sand bed 4 and is prevented from forming an impervious cake. The material of the bed's surface can be skimmed off and removed from chamber 1 from time to time, or washed out of the chamber by the water backwashing procedure which is employed to reactivate the sand bed. The liquid which is substantially free of solid matter is conveyed out of chamber 1 through pipes 10 and 11 to a recovery site and/or receptacle (not shown).

When the filter becomes overly congested with sediment, it can be readily restored to its maximum efficiency by passing water upward in pipe 10 through the sand bed 4 and out through the top of the chamber by means of pipe 12. The wash water containing sediment is routed by means of pipe 13 into the sedimentation tank in which the water is made to cascade or spill over into a number of cells 14 in succession, some sediment thus being trapped and settling to the tank bottom in each of these cells. The clarified water is then diverted through pipe 15 either into the storage tank 3 or through pipes 16, 17, and 10 into the bottom of chamber 1 for further use in backwashing the sand bed. Optionally, the clarified water from tank 3 could be sent through pipes 16 and 22 to recover in the event that it is not desired to use this water for further backwashing of the sand bed.

When the backwash water issuing from chamber 1 through pipe 12 is relatively clear, it is preferably made to by-pass the sedimentation tank and is instead sent through pipe 18 directly to the storage tank where it is held until it is again needed for circulation through the sand bed in chamber 1. The re-use of the same water for backwashing a number of times serves as a means for recovering any valuable solid matter being filtered, such as sugar, which may be trapped in the bed during the filtration operation. For example, when applied to the sugar purification process which is described in my aforementioned copending application, Serial No. 817,467, such continuous re-use of the backwash water causes a substantial percentage of sugar to be picked up thereby; and, when the concentration builds up sufficiently, the aqueous solution may be processed to recover the sugar. As more water is required in the system, it is introduced from a fresh water inlet through pipe 20 and then directed through pipes 17 and 10 up through the sand bed. Actually, this is the way the initial backwashing of the bed is accomplished when there is not yet enough liquid in storage tank 3 for this purpose.

The filtration apparatus described above permits the liquid to be passed through the sand filtering medium rapidly and without any appreciable blockage. The gentle rotary scraping or agitation motion which is administered to the surface of the sand bed keeps the porous openings into the sand bed unclogged at all times. The ability to backwash the sand bed and float the sediment up out of the filtration chamber, in combination with this raking of the bed surface, provides an effective, rapid-flow filter which can be used and thus readily reactivated for re-use indefinitely.

The arrangement of paddles above the bed-raking mechanism makes for an even more effective filtering device by acting as a supplemental stirrer, as above described, and by temporarily holding back the larger clumps of solid matter so as to let the liquid separate therefrom and pass into the sand bed without hindrance thereby. The further combination of this unique sand-filter with the sedimentation tank and the storage tank makes for a highly efficient system of filtration in that the quantities of "new" water required are held to a minimum. Moreover, this combination makes it possible to salvage a considerable amount of the desired material, such as sugar, which may happen to be retained in the filter medium in the course of the first few passes of the wash water.

Valves, V, are provided at strategic points throughout the apparatus so that the liquid can be directed or diverted along any desired route as shown in the drawing. One or more pumps, P, are provided to maintain circulation of the liquid throughout the system.

As an illustration of the effectiveness of my novel sand filtration device, some 25 liters of sugar diffusion juice, purified in accordance with the method disclosed in my aforementioned copending application, Serial No. 817,467, were allowed to settle and about 3 liters of clear liquid decanted; the remaining 22 liters were run through a chamber such as that represented by reference character 1 in the accompanying drawing. The chamber, in this instance, had a diameter of 14.8 cm., a depth of sand of 9.0 cm., and a void above the sand of 12.0 cm. The volume of sand was 1.54 liters.

As the filtration proceeded, rake 6 was activated by slowly turning wheel 8 and rod 7. Neither pressure nor vacuum was applied, as the 12.0 cm. of hydrostatic pressure existing in the filter appeared to suffice. The rate of filtration was greatly accelerated by this means, the result being:

| Time (minutes) | 1 | 2 | 3 | 4 | 5 | 6 |
|---|---|---|---|---|---|---|
| Mls. of filtrate per minute | 580 | 560 | 750 | 650 | 770 | 600 |

The average rate was 651 ml./min., which is equivalent to 37.84 liters per min./sq. meter of filter surface. The clear, decanted liquor was also filtered through the sand filter; and the filtration rate proved to be about the same as for the first portion. This indicated that the sand filter caused little impedance to the flow of liquid through the filter.

It will be apparent that the sand filtration portion of the apparatus can be used alone or in conjunction with the sedimentation and/or storage tanks. The filtration portion of the apparatus will be useful on its own account primarily in batch-wise filtrations, or when the precipitates are not too flocculent. In a continuous process, and particularly when the precipitate is flocculent or rather dense, use of the entire apparatus will be far more expedient.

The cyclic, or continuous operation employing the entire apparatus makes possible not only the convenient regeneration of the sand filter by backwashing, but also the maximization of recovery of the desired material, such as sugar. If filter regeneration were the sole problem, new and unused water could be employed as a backwash. But by constantly circulating water which has passed through the filter and the sedimentation tank, not only is the filtrate made more and more pure, but also its concentration of the recovered matter is increased. In this respect, the storage tank plays an important part; whether the filtrate is passed through the sedimentation or not, storage of the filtrate until used to backwash the filter is essential. Thus, the filter, the sedimentation, and the storage tanks have interrelationships which are essential for a commercial-scale operation.

Many minor modifications of the apparatus, all without departure from the spirit and scope of the invention, will be obvious to those skilled in the art. For example, the valving, V, in the drawing can be rearranged, as can the pump, P, the positioning of the pipes, etc. The filter, sedimentation, and storage tanks are merely shown schematically; and they can take various forms. Accordingly, I desire only to be limited by the following claims and not by the specific examples and illustrations set forth hereinabove.

I claim:

1. A method of continuously purifying and concentrating sugar-containing liquids by removing undesired undissolved solid non-sugars from a mixture thereof with a liquid which also contains desired solid sugars in solution, comprising, passing the impure sugar-containing liquid down through a filter containing a bed of sand, raking the surface of the sand bed to break up any cake forming there, passing clarified sugar-containing liquid up through the sand bed to regenerate the bed by backwashing out of the filter the sediment accumulated on the bed, passing the sugar-containing backwashing liquid from the filter into and through a sedimentation tank to clarify that liquid, then passing the thus clarified sugar-containing backwashing liquid up through the sand bed again, and after a multiple number of such backwashing passes drawing off the purified and more concentrated sugar-containing liquid.

2. A method of continuously purifying and concentrating sugar-containing liquids by removing undesired undissolved solid non-sugars from a mixture thereof with a liquid which also contains desired solid sugars in solution, comprising, passing the impure sugar-containing liquid down through a filter containing a bed of sand, passing clarified sugar-containing liquid up through the sand bed to regenerate the bed by backwashing out of the filter the sediment accumulated on the bed, directing the sugar-containing backwashing liquid that has passed up through the sand bed and out of the filter up through the sand bed at least one more time, whereby any of the sugar solids which may have been dissolved in the liquid and have become trapped on the sand bed are recovered from the sand bed and concentrated in the backwashing liquid as it leaves the bed.

3. In the method of claim 2, the additional step of passing into a storage tank the clarified sugar-containing liquid that has been backwashed out of the filter, then directing the liquid as needed from the storage tank up through the sand bed at least one more time.

References Cited in the file of this patent

UNITED STATES PATENTS

| | | |
|---|---|---|
| 461,234 | Butler | Oct. 13, 1891 |
| 819,358 | MacDougall | May 1, 1906 |
| 1,318,363 | Desrumaux | Oct. 14, 1919 |
| 2,105,221 | McCoy | Jan. 11, 1938 |
| 2,236,895 | Court | Apr. 1, 1941 |
| 2,284,122 | Boyd | May 26, 1942 |
| 2,453,345 | Row et al. | Nov. 9, 1948 |
| 2,675,350 | Robinson | Apr. 13, 1954 |

FOREIGN PATENTS

| | | |
|---|---|---|
| 120,595 | Great Britain | Oct. 11, 1917 |